United States Patent
Lee et al.

(10) Patent No.: US 11,158,849 B2
(45) Date of Patent: Oct. 26, 2021

(54) LITHIUM ION BATTERY INCLUDING NANO-CRYSTALLINE GRAPHENE ELECTRODE

(71) Applicants: Samsung Electronics Co., Ltd., Suwon-si (KR); SEOUL NATIONAL UNIVERSITY R&DB FOUNDATION, Seoul (KR)

(72) Inventors: Minhyun Lee, Yongin-si (KR); Seongjun Park, Seoul (KR); Hyunjae Song, Hwaseong-si (KR); Hyeonjin Shin, Suwon-si (KR); Ki-Bum Kim, Seoul (KR); Yunhho Kang, Seoul (KR); Sanghun Lee, Seoul (KR)

(73) Assignees: Samsung Electronics Co., Ltd., Gyeonggi-do (KR); Seoul National University R&DB Foundation, Seoul (KR)

(*) Notice: Subject to any disclaimer, the term of this patent is extended or adjusted under 35 U.S.C. 154(b) by 0 days.

(21) Appl. No.: 16/015,835

(22) Filed: Jun. 22, 2018

(65) Prior Publication Data
US 2019/0097215 A1    Mar. 28, 2019

(30) Foreign Application Priority Data
Sep. 22, 2017   (KR) .................. 10-2017-0122886

(51) Int. Cl.
*H01M 4/36*     (2006.01)
*H01M 10/0525*  (2010.01)
(Continued)

(52) U.S. Cl.
CPC .......... *H01M 4/366* (2013.01); *H01M 4/133* (2013.01); *H01M 4/1393* (2013.01); *H01M 4/38* (2013.01);
(Continued)

(58) Field of Classification Search
CPC .. H01M 10/0525; H01M 4/133; H01M 4/366; H01M 4/38; H01M 4/587
See application file for complete search history.

(56) References Cited

U.S. PATENT DOCUMENTS

2010/0176337 A1   7/2010   Zhamu et al.
2012/0064409 A1   3/2012   Zhamu et al.
(Continued)

FOREIGN PATENT DOCUMENTS

JP   2013-191548 A   9/2013
JP   2017-502898 A   1/2017
(Continued)

OTHER PUBLICATIONS

Electrophoretic Nanocrystalline Graphene Film Electrode for Lithium Ion Battery; Kaspars Kaprans, Gunars Bajars, Gints Kucinskis, Anna Dorondo, Janis Mateuss, Jevgenijs Gabrusenoks, Janis Kleperis, Andrejs Lusis; Institute of Solid State Physics, University of Latvia, 8 Kengaraga street, LV-1063, Riga (Year: 2014).*

(Continued)

*Primary Examiner* — Sarah A. Slifka
*Assistant Examiner* — Rachel L Zhang
(74) *Attorney, Agent, or Firm* — Harness, Dickey & Pierce, P.L.C.

(57) ABSTRACT

Provided are lithium ion batteries including a nano-crystalline graphene electrode. The lithium ion battery includes a cathode on a cathode current collector, an electrolyte layer on the cathode, an anode on the electrolyte layer, and an anode current collector on the anode. The anode and the cathode include a plurality of grains having a size in a range from about 5 nm to about 100 nm. The cathode has a double bonded structure in which a carbon of the graphene is combined with oxygen.

10 Claims, 2 Drawing Sheets

(51) Int. Cl.

| | |
|---|---|
| H01M 4/133 | (2010.01) |
| H01M 4/587 | (2010.01) |
| H01M 4/38 | (2006.01) |
| H01M 10/0562 | (2010.01) |
| H01M 10/0585 | (2010.01) |
| H01M 10/0566 | (2010.01) |
| H01M 4/70 | (2006.01) |
| H01M 4/62 | (2006.01) |
| H01M 4/1393 | (2010.01) |
| B82Y 30/00 | (2011.01) |
| H01M 4/02 | (2006.01) |
| H01M 4/66 | (2006.01) |

(52) U.S. Cl.
CPC .............. *H01M 4/587* (2013.01); *H01M 4/62* (2013.01); *H01M 4/70* (2013.01); *H01M 10/0525* (2013.01); *H01M 10/0562* (2013.01); *H01M 10/0566* (2013.01); *H01M 10/0585* (2013.01); *B82Y 30/00* (2013.01); *H01M 4/661* (2013.01); *H01M 2004/021* (2013.01)

(56) References Cited

U.S. PATENT DOCUMENTS

| | | | |
|---|---|---|---|
| 2013/0059174 A1* | 3/2013 | Zhamu | H01M 4/583 429/50 |
| 2013/0271085 A1* | 10/2013 | Chen | H01M 4/0445 320/132 |
| 2013/0323608 A1 | 12/2013 | Chang et al. | |
| 2014/0209480 A1* | 7/2014 | Cheng | H01G 11/28 205/759 |
| 2014/0234710 A1* | 8/2014 | Lee | H01M 4/366 429/219 |
| 2014/0255776 A1* | 9/2014 | Song | H01G 11/32 429/211 |
| 2014/0255791 A1 | 9/2014 | Miao et al. | |
| 2015/0086881 A1* | 3/2015 | Zhamu | H01G 11/68 429/405 |
| 2015/0103469 A1* | 4/2015 | Lee | H01G 11/52 361/502 |
| 2016/0036045 A1 | 2/2016 | Burshtain et al. | |
| 2016/0043384 A1* | 2/2016 | Zhamu | H01M 4/366 429/231.4 |
| 2016/0215401 A1 | 7/2016 | Rantala | |
| 2016/0285095 A1 | 9/2016 | Kang et al. | |
| 2016/0293956 A1 | 10/2016 | Wang et al. | |
| 2016/0294000 A1 | 10/2016 | He et al. | |

FOREIGN PATENT DOCUMENTS

| | | |
|---|---|---|
| KR | 10-1199538 B1 | 11/2012 |
| KR | 10-2015-0016072 A | 2/2015 |

OTHER PUBLICATIONS

Structural Defects in Graphene; Florian Banhart, Jani Kotakoski, and Arkady V. Krasheninnikov; Institutde Physique et Chimie des Materiaux (Year: 2020).*

ViPER—Research Website: https://engineering.purdue.edu/ViPER/research.html (Jan. 31, 2018).

Jang, Bor et al. "Graphene Surface-Enabled Lithium Ion-Exchanging Cells: Next-Generation High-Power Energy Storage Devices." *Nano Letters* 11.9 (2011): 3785-3791.

Kim, Haegyeom et al. "All-graphene-battery: bridging the gap between supercapacitors and lithium ion batteries." *Scientific Reports* 4 (2014): 05278 1-8.

Wei, Di et al. "Ultrathin rechargeable all-solid-state batteries based on monolayer graphene." *Journal of Materials Chemistry A* 1.9 (2013): 3177-3181.

Sun, Haiyan et al. "Binder-free graphene as an advanced anode for lithium batteries." *Journal of Materials Chemistry A* 4.18 (2016): 6886-6895.

Saulnier, Mathieu et al. "Investigation of CVD multilayered graphene as negative electrode for lithium-ion batteries." *Electrochimica Acta* 244 (2017): 54-60.

Song, Zhiping et al. "Polymer-Graphene Nanocomposites as Ultrafast-Charge and -Discharge Cathodes for Rechargeable Lithium Batteries." *Nano Letters* 12.5 (2012): 2205-2211.

Kim, Haegyeom et al. "Scalable Functionalized Graphene Nano-platelets as Tunable Cathodes for High-performance Lithium Rechargeable Batteries." *Scientific Reports* 3 (2013): 1506 1-8.

Kim, Miinsu et al. "Highly Stable and Effective Doping of Graphene by Selective Atomic Layer Deposition of of Ruthenium." *ACS Applied Materials & Interfaces* 9 (2017): 701-709.

* cited by examiner

LITHIUM ION BATTERY INCLUDING NANO-CRYSTALLINE GRAPHENE ELECTRODE

CROSS-REFERENCE TO RELATED APPLICATION

This application claims the benefit of Korean Patent Application No. 10-2017-0122886, filed on Sep. 22, 2017, in the Korean Intellectual Property Office, the disclosure of which is incorporated herein in its entirety by reference.

BACKGROUND

1. Field

The present disclosure relates to lithium ion batteries including nano-crystalline graphene electrodes.

2. Description of the Related Art

A lithium ion battery uses lithium as a carrier ion. A lithium ion battery including a cathode based on a lithium transition metal oxide has a low power density due to slow diffusion of solid state lithium and low electrical conductivity.

Also, a cathode includes a binder and a conductor, and thus energy density of the lithium ion battery is lower.

Also, when a conductor and a binder are included in a material used as an anode, the energy density of a manufactured lithium ion battery may be reduced.

SUMMARY

Provided are lithium ion batteries that have increased energy and/or power density.

Provided are lithium ion batteries in which nano-crystalline graphene having conductivity and/or adhesiveness is directly used as electrodes of the lithium ion batteries.

Additional aspects will be set forth in part in the description which follows and, in part, will be apparent from the description, or may be learned by practice of the presented embodiments.

According to an aspect of example embodiments, a lithium ion battery including nano-crystalline graphene electrodes, the lithium ion battery includes: a cathode on a cathode current collector; an electrolyte layer on the cathode; an anode on the electrolyte layer, and an anode current collector on the anode, wherein at least one of the anode and the cathode includes nano-crystalline graphene.

The anode and the cathode respectively may include nano-crystalline graphene.

The nano-crystalline graphene may include a plurality of grains having a size in a range from about 5 nm to about 100 nm.

The cathode may include oxygen double bonds with carbons of the nano-crystalline graphene, and the oxygen double bonds may combine with lithium ions in a discharging process and are separated from the lithium ions in a charging process.

The nano-crystalline graphene may have a thickness in a range from about 1 nm to about 100 nm.

The nano-crystalline graphene may include a plurality of horizontal graphene layers arranged in parallel to surfaces of the cathode and the anode.

The nano-crystalline graphene may further include a plurality of vertical graphene layers on the horizontal graphene layers in a direction substantially perpendicular to a surface of the horizontal graphene layer.

The lithium ion battery may further include a metal layer including a plurality of island metals on a surface of the horizontal graphene layer of the cathode facing the anode current collector.

The metals may include Ru, Ni, or Pt.

The lithium ion battery may further include a metal layer including a plurality of island metals on a surface of the vertical graphene layers of the cathode.

The electrolyte layer may include a solid electrolyte.

The nano-crystalline graphene of the anode may have a defect structure in which one of six carbons of a cell is omitted.

The electrolyte layer may include a liquid electrolyte impregnated in a separator arranged between the anode and the cathode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
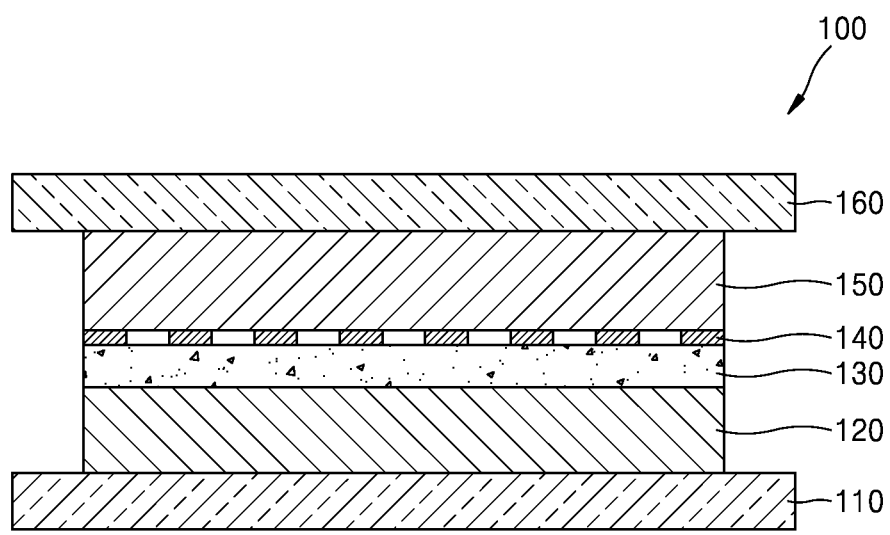
FIG. 1 is a cross-sectional view of a schematic configuration of a lithium ion battery including nano-crystalline graphene electrodes according to an example embodiment.

Reference will now be made in detail to example embodiments, examples of which are illustrated in the accompanying drawings. In the drawings, thicknesses of layers and regions may be exaggerated for clarity of layers and regions. The embodiments of the inventive concept are capable of various modifications and may be embodied in many different forms.

It will be understood that when an element or layer is referred to as being "on" or "above" another element or layer, the element or layer may be directly on another element or layer or intervening elements or layers.

FIG. 1 is a cross-sectional view of a schematic configuration of a lithium ion battery 100 including nano-crystalline graphene electrodes according to an example embodiment.

Referring to FIG. 1, the lithium ion battery 100 includes an anode 120, an electrolyte layer 130, a cathode 150, and/or a cathode current collector 160 sequentially arranged on an anode current collector 110.

The anode current collector 110 may be a thin metal film. The anode current collector 110 may include, for example, copper, stainless steel, nickel, aluminum, and titanium. The anode current collector 110 may include copper having a thickness of approximately 2 μm.

The anode 120 may be a nano-crystalline graphene including grains having a size in a range from about 5 nm to about 100 nm. If the size of the grain is less than 5 nm, resistance may be increased. If the grain size is greater than 100 nm, insertion and discharge velocity of lithium ions may be reduced.

The nano-crystalline graphene has a grain size of nanometers, and is distinguished from crystalline graphene generally having a grain size of a few μm. When nano-crystalline graphene is used as the anode 120, the insertion and discharge velocity of lithium ions in the anode 120 is increased. That is, a lithium ion battery in which the nano-crystalline graphene is used as electrodes may have increased power density. The nano-crystalline graphene may be manufactured on the anode current collector 110 or the cathode current collector 160 formed of a metal by decomposing and depositing a carbon precursor material, such as $CH_4$ or $C_2H_2$ at a temperature below a melting point of the metal of the anode current collector 110 or the cathode current collector 160 by using a plasma enhanced chemical vapor deposition (PECVD) method. Graphene deposited by using a thermal chemical vapor deposition (TCVD) at high temperature generally has a grain size of micrometers. However, in the example embodiments, graphene having a nano size may be deposited by using the PECVD method.

Also, the nano-crystalline graphene may be manufactured by coating an aqueous solution including graphene having a grain size of a few nano meters on a surface of the anode current collector 110 and drying the coating.

When graphene is processed with argon plasma (or oxygen plasma), a defect of leaving carbon from a cell of a hexagonal shape of the graphene may occur. The anode 120 having the defect may have an increased insertion and discharge velocity.

The anode 120 may include a plurality of graphene layers. Lithium ions may move between the graphene layers. The anode 120 may have a thickness in a range from about 1 nm to about 1000 nm.

Figure 2:
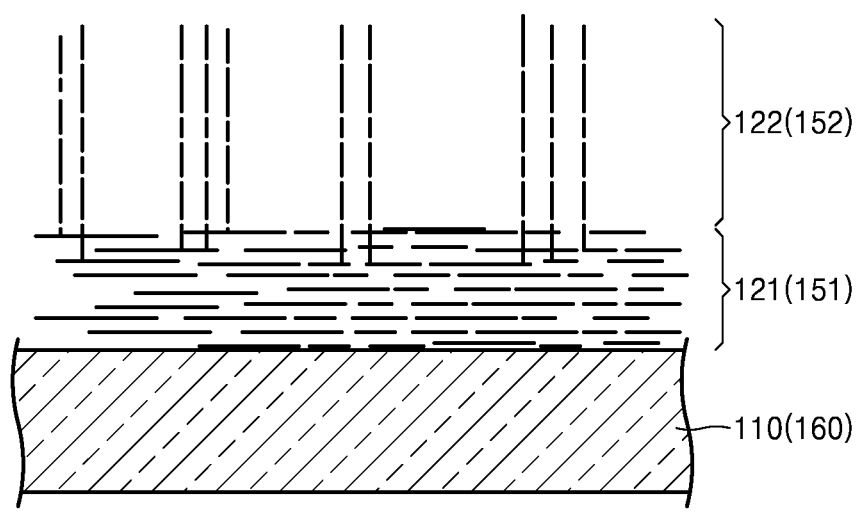
FIG. 2 is a schematic diagram of an anode and a cathode according to an example embodiment.

FIG. 2 is a schematic diagram of the anode 120 and the cathode 150 according to an example embodiment. In FIG. 2, in order to depict grains of the nano-crystalline graphene, grains are depicted as separated from one another.

Referring to FIG. 2, the anode 120 including a plurality of graphene layers may be formed on the anode current collector 110 by using a CVD method directly. The anode 120 may include a horizontal graphene layer 121 that is parallel with respect to the anode current collector 110.

A plurality of vertical graphene layers 122 may further be formed on the horizontal graphene layer 121. The vertical graphene layers 122 are approximately perpendicular to a surface of the horizontal graphene layer 121. The vertical graphene layers 122 may be omitted from the lithium ion battery 100 according to example embodiments. The vertical graphene layers 122 may be formed by controlling a growing speed of graphene using a PECVD method.

The horizontal graphene layer 121 reduces an electrical path from a surface of the horizontal graphene layer 121 to the anode current collector 110.

The graphene that constitutes the anode 120 may be a conductor, and the graphene has favorable adsorbability with respect to the anode current collector 110, and thus, the anode 120 may be formed without a binder and/or a conductor generally used for forming the traditional anode. Accordingly, the energy density of a lithium ion battery having this anode 120 may be increased.

The vertical graphene layers 122 may facilitate the adsorption and desorption of lithium ions therebetween.

The electrolyte layer 130 may include a solid electrolyte. The electrolyte layer 130 may function as a passage for lithium ions between the cathode 150 and the anode 120. The electrolyte layer 130 may be formed as a solid body.

The electrolyte layer 130 may include an oxide group lithium ion conductor or a sulfide group lithium ion conductor. The oxide group lithium ion conductor may include, for example, $Li_{0.33}La_{0.56}TiO_3$ (LLTO), $Li_{1.2}Ti_{1.7}Al_{0.3}(PO_4)_3$ (LATP), or $Li_{2.9}PO_{3.3}N_{0.46}$ (LiPON).

The sulfide group lithium ion conductor may include, for example, $L_{3.25}Ge_{0.25}P_{0.75}S_4$ (LGPS), $Li_3PS_4$, or $Li_4GeS_4$. The solid electrolyte layer may be formed by using a CVD method.

The electrolyte layer 130 may have a thickness in a range from about 1 μm to about 5 μm.

When a lithium ion battery is charged or discharged, a reaction at the anode 120 is as the Chemical Reaction 1.

$LiC_3 \leftrightarrow 3C + Li^+ + e^-$     <Chemical Reaction 1>

In a charge process, lithium ions may be stored between the graphene layers in the anode 120, and the lithium ions stored between the graphene layers is discharged from the anode 120 in a discharge process.

The cathode 150 may be nano-crystalline graphene including grain size in a range from about 5 nm to about 100 nm. If the grain size is less than 5 nm, resistance may be increased. if the grain size is greater than 100 nm, insertion and discharge velocity of lithium ions may be reduced.

Nano-crystalline graphene of the cathode 150 has a nano size and is generally distinguished from crystalline graphene having a grain size of a few micrometer sizes. When the nano-crystalline graphene is used as the cathode 150, insertion and discharge velocity of lithium ions in the cathode 150 may be increased. That is, a lithium ion battery that uses the nano-crystalline graphene as electrodes may have an increased power density.

The cathode 150 may include a plurality of graphene layers. The cathode 150 may have a thickness in a range from about 1 nm to about 1000 nm.

The cathode 150 may include nano-crystalline graphene having the same structure as the anode 120 depicted in FIG. 2. The cathode 150 may include a plurality of nano-crystalline graphene layers formed by using a CVD method directly on the cathode current collector 160. The cathode 150 may include a horizontal graphene layer 151 formed to be parallel with respect to the cathode current collector 160.

A plurality of vertical graphene layers 152 may further be formed on the horizontal graphene layer 151. The vertical graphene layers 152 are approximately perpendicular to a surface of the horizontal graphene layer 151. The vertical graphene layers 152 may be omitted from the lithium ion battery according to example embodiments. The horizontal graphene layer 151 reduces an electrical path from a surface of the horizontal graphene layer 151 to the cathode current collector 160.

Graphene that constitutes the cathode 150 may be a conductor and has a favorable adsorbability with respect to the cathode current collector 160, and thus, the cathode 150 may be formed without an additional binder and a conductor generally used for forming the traditional cathode. Accordingly, the energy density of a lithium ion battery having the cathode 150 may be increased.

A functional group is formed in the graphene of the cathode 150. The functional group accommodates Li ions in a discharging process, and discharges Li ions in a charging process. The functional group may be a C=O double bond. The C=O double bond may be formed on the graphene by oxidizing the graphene in a manufacturing process of the cathode 150. The C=O double bond is transformed to a single bond in a discharging process, and is restored in a charging process.

A reaction at the cathode 150 may be as Chemical Reaction 2.

$>C=O + Li^+ + e^- \leftrightarrow >C-O-Li$     <Chemical Reaction 2>

The C=O double bond may be achieved by supplying oxygen in a manufacturing process of graphene. One of the methods of forming the C=O double bond on the graphene is that, after forming a plurality of nano-crystalline graphene layers on the cathode current collector 160, a metal is deposited on the nano-crystalline graphene layers by using an atomic layer deposition (ALD) method. When oxygen is supplied to the metal ALD process, the C=O double bond is formed by combining the oxygen with a carbon of the nano-crystalline graphene layers. The metal may include Ru, Ni, or Pt. The metal ALD process increases the C=O double bond and the metal doping increases conductivity of the cathode 150 formed of graphene.

The cathode 150 having the C=O double bonds has a potential higher than that of the anode 120, and accordingly, when discharging the lithium ion battery 100, Li ions are discharged from the anode 120 and are stored in the cathode 150.

The metal is primarily formed along a grain boundary of graphene on the anode 120. The metal, for example, ruthenium, may reduce resistance of the graphene. The metal may form a metal layer 140 having holes or pores. The metal layer 140 may include a plurality of island metals. Accordingly, the metal layer 140 may be referred to as a porous metal layer.

The holes of the metal layer 140 may be reduced according to the number of metal ALD cycles. For example, the metal ALD cycles may be in a range from about 5 to about 200.

The ALD metal may form the metal layer 140 on the horizontal graphene layer 151. However, when the vertical graphene layers 152 are included in the cathode 150, a metal layer (not shown) including island metals may be formed along a surface of the vertical graphene layers 152.

The cathode current collector 160 may be a conductor through which a current flows. For example, the cathode current collector 160 may include Ag, Cu, Au, Al, Mo, W, Zn, Ni, Fe, Pt, Cr, Ta, or Ti. The cathode current collector 160 may include Al and may have a thickness in a range from about 1 μm to about 15 μm.

In the lithium ion battery 100 according to example embodiments, the anode 120 and the cathode 150 are formed on the corresponding current collectors without using a binder and/or a conductor, and thus, energy density of the lithium ion battery 100 may be increased.

Also, in the lithium ion battery 100 according to example embodiments, electrodes (the anode 120 and the cathode 150) formed of nano-crystalline graphene include graphene grains having a nano size, and thus, charge and discharge speed of the lithium ion battery 100 is increased, and accordingly, the power density of the lithium ion battery 100 may be increased.

In example embodiments described above, both the anode 120 and the cathode 150 include nano-crystalline graphene, but example embodiments are not limited thereto. For example, one of the anode 120 and the cathode 150 may be an electrode including the nano-crystalline graphene and the other electrode may be a commonly used electrode. The commonly used electrode may be a lithium anode electrode or a cathode electrode including a lithium transition metal oxide, such as $LiCoO_2$ or $LiMn_2O_4$.

Figure 3:
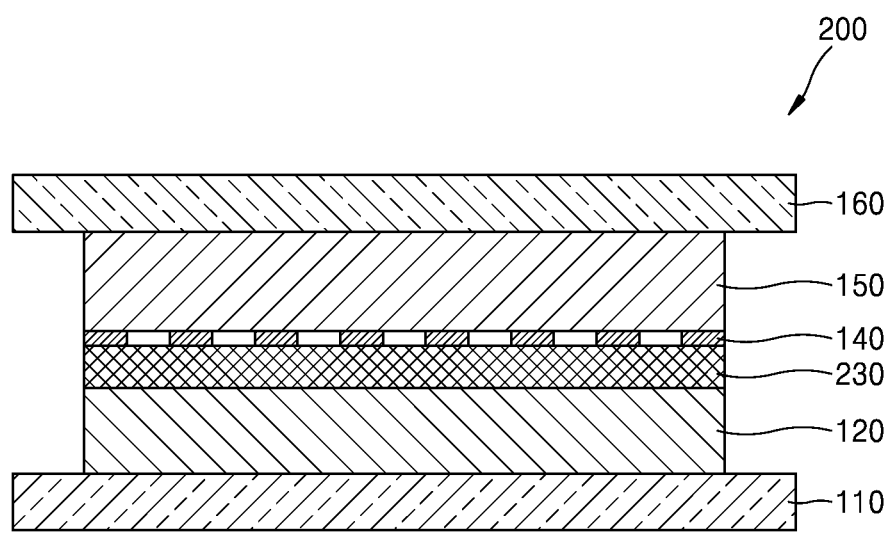
FIG. 3 is a cross-sectional view of a schematic configuration of a lithium ion battery including nano-crystalline graphene electrodes according to another example embodiment.

FIG. 3 is a cross-sectional view of a schematic configuration of a lithium ion battery 200 including nano-crystalline graphene electrodes according to another example embodiment. Like reference numerals are used for constituent elements that are substantially identical to the constituent elements of FIG. 1, and the descriptions thereof will not be repeated.

Referring to FIG. 3, the lithium ion battery 200 includes a separator 230 in which a liquid electrolyte is impregnated, and the separator 230 is disposed between the anode 120 and the cathode 150. The lithium ion battery 200 may further include a packing member (not shown) that surrounds the anode current collector 110 and the cathode current collector 160.

The separator 230 may be a porous film including minute pores. The separator 230 reduces or prevents the anode 120 and the cathode 150 from contacting each other and functions as a path of lithium ions included in the liquid electrolyte. The separator 230 may be, for example, a polypropylene-polyethylene-polypropylene membrane. For example, the separator 230 may include Celgard 2500®.

The liquid electrolyte may be an electrolyte solution in which a lithium salt is dissolved in an organic solvent. For example, the liquid electrolyte may include $LiClO_4$ dissolved in a mixed solution in which ethylene carbonate and di-methyl carbonate are mixed in a volume ratio of 1:1. $LiClO_4$ may be dissolved approximately to a concentration of 1 M.

The packing member reduces or prevents the liquid electrolyte from leaking to the outside. The packing member may be, for example, an aluminum laminate pouch coated with a resin.

The operation of the lithium ion battery 200 including the nano-crystalline graphene electrodes may be substantially the same as the operation of the lithium ion battery 100 described above, and thus, the descriptions thereof will not be repeated.

According to example embodiments, in a lithium ion battery, an anode and a cathode are formed on corresponding current collectors without using a binder and/or a conductor, thereby increasing energy density of the lithium ion battery.

Also, nano-crystalline graphene electrodes (anode and cathode) formed of grains of nano size increase the charge and discharge speed of the lithium ion battery, and accordingly, the power density of the lithium ion battery is increased.

While one or more embodiments have been described with reference to the figures, it will be understood by those of ordinary skill in the art that various changes in form and details may be made therein. Therefore, the scope of the invention is defined not by the detailed description but by the technical scope defined by the appended claims.

What is claimed is:

1. A lithium ion battery including nano-crystalline graphene electrodes, the lithium ion battery comprising:
   a cathode on a cathode current collector;
   an electrolyte layer on the cathode;
   an anode on the electrolyte layer; and
   an anode current collector on the anode,
   wherein at least one of the anode and the cathode includes nano-crystalline graphene, the nano-crystalline graphene including a plurality of grains having a size in a range from about 5 nm to about 100 nm,
   wherein the cathode does not include a binder, and the anode does not include a binder,
   wherein the anode includes a plurality of graphene layers,
   wherein the cathode includes a functional group formed in the nano-crystalline graphene, the functional group including a C=O double bond combinable with lithium ions in a discharging process and separable from the lithium ions in a charging process, wherein the at least one of the anode and the cathode including nano-crystalline graphene is doped with a metal including at least one Ru, Ni, or Pt, wherein the nano-crystalline graphene includes a plurality of horizontal graphene layers arranged in parallel to surfaces of the cathode and the anode, and wherein the nano-crystalline graphene further includes a plurality of vertical graphene layers on the plurality of horizontal graphene layers in a direction substantially perpendicular to a surface of the horizontal graphene layer.

2. The lithium ion battery of claim 1, wherein the anode and the cathode include the nano-crystalline graphene.

3. The lithium ion battery of claim 2, wherein the nano-crystalline graphene has a thickness in a range from about 1 nm to about 100 nm.

4. The lithium ion battery of claim 1, further comprising a metal layer including a plurality of island metals on a surface of the horizontal graphene layer of the cathode facing the anode current collector.

5. The lithium ion battery of claim 4, wherein the metal layer includes Ru, Ni, or Pt.

6. The lithium ion battery of claim 1 further comprising a metal layer including a plurality of island metals on a surface of the vertical graphene layers of the cathode.

7. The lithium ion battery of claim 6, wherein the metal layer includes Ru, Ni, or Pt.

8. The lithium ion battery of claim 2, wherein the electrolyte layer includes a solid electrolyte.

9. The lithium ion battery of claim 2, wherein the nano-crystalline graphene of the anode has a defect structure in which one of six carbons of a cell is omitted.

10. The lithium ion battery of claim 2, wherein the electrolyte layer includes a liquid electrolyte impregnated in a separator arranged between the anode and the cathode.

\* \* \* \* \*